United States Patent
Nishino et al.

(10) Patent No.: US 12,180,364 B2
(45) Date of Patent: Dec. 31, 2024

(54) AROMATIC POLYCARBONATE RESIN COMPOSITION

(71) Applicant: Mitsubishi Chemical Corporation, Chiyoda-ku (JP)

(72) Inventors: Yohei Nishino, Hiratsuka (JP);
Norikazu Konishi, Chiyoda-ku (JP);
Yuuichi Yayama, Chiyoda-ku (JP);
Hiroki Shibata, Chiyoda-ku (JP);
Toshiki Monden, Chiyoda-ku (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 275 days.

(21) Appl. No.: 17/288,791

(22) PCT Filed: Nov. 7, 2019

(86) PCT No.: PCT/JP2019/043620
§ 371 (c)(1),
(2) Date: Apr. 26, 2021

(87) PCT Pub. No.: WO2020/095981
PCT Pub. Date: May 14, 2020

(65) Prior Publication Data
US 2022/0002540 A1    Jan. 6, 2022

(30) Foreign Application Priority Data
Nov. 8, 2018   (JP) .................. 2018-210621

(51) Int. Cl.
*C08L 69/00*   (2006.01)
*C08G 64/06*   (2006.01)
(Continued)

(52) U.S. Cl.
CPC .............. *C08L 69/00* (2013.01); *C08G 64/06* (2013.01); *C08G 64/307* (2013.01);
(Continued)

(58) Field of Classification Search
CPC ................. C08L 69/00; C08L 2205/02; C08L 2205/025; C08G 64/06; C08G 64/307
See application file for complete search history.

(56) References Cited

U.S. PATENT DOCUMENTS

| | | |
|---|---|---|
| 2013/0030112 A1 | 1/2013 | Hitomi et al. |
| 2013/0030113 A1 | 1/2013 | Hitomi et al. |

(Continued)

FOREIGN PATENT DOCUMENTS

| | | |
|---|---|---|
| JP | 2011-105931 A | 6/2011 |
| JP | 2011-105932 A | 6/2011 |

(Continued)

OTHER PUBLICATIONS

International Search Report issued on Jan. 28, 2020 in PCT/JP2019/043620 filed on Nov. 7, 2019, 3 pages.

(Continued)

*Primary Examiner* — Marc S Zimmer
*Assistant Examiner* — Surbhi M Du
(74) *Attorney, Agent, or Firm* — Oblon, McClelland, Maier & Neustadt, L.L.P.

(57) ABSTRACT

Provided is an aromatic polycarbonate resin composition that exhibits an excellent surface hardness and strength as well as an excellent designability and lightfastness. The aromatic polycarbonate resin composition contains a carbonate structural unit (X) derived from an aromatic dihydroxy compound represented by a prescribed formula (1) and a carbonate structural unit (Y) derived from an aromatic dihydroxy compound represented by a prescribed formula (2) in a proportion of (X)/(Y)=10/90 to 40/60 as a molar ratio, wherein an amount of a cresolic hydroxy group derived from the aromatic dihydroxy compound represented by formula (1) is 60 to 160 ppm.

6 Claims, 1 Drawing Sheet

(51) Int. Cl.
*C08G 64/30* (2006.01)
*C08K 5/3447* (2006.01)
(52) U.S. Cl.
CPC ........ *C08K 5/3447* (2013.01); *C08L 2205/02* (2013.01); *C08L 2205/025* (2013.01)

(56) References Cited

U.S. PATENT DOCUMENTS

2015/0210851 A1    7/2015  Tajima
2017/0158852 A1*   6/2017  Ko ........................ C08G 64/186

FOREIGN PATENT DOCUMENTS

| | | |
|---|---|---|
| JP | 2012-214620 A | 11/2012 |
| JP | 2016-141722 A | 8/2016 |
| JP | 2016-155957 A | 9/2016 |
| JP | 2017-52867 A | 3/2017 |
| JP | 2017-178977 A | 10/2017 |
| JP | 2017-179331 A | 10/2017 |
| WO | WO 2014/038500 A1 | 3/2014 |

OTHER PUBLICATIONS

Extended European Search Report issued on Jul. 5, 2022 in European Patent Application No. 19881536.7, 6 pages.

\* cited by examiner

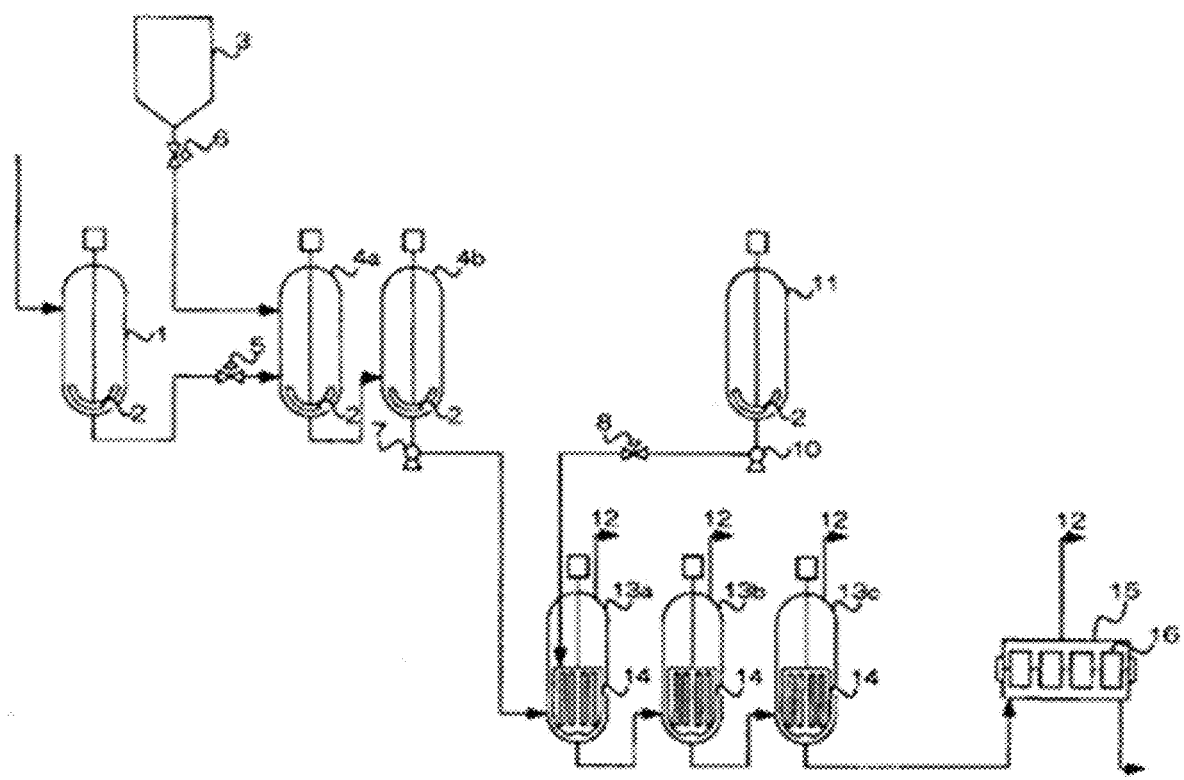

AROMATIC POLYCARBONATE RESIN COMPOSITION

TECHNICAL FIELD

The present invention relates to an aromatic polycarbonate resin composition and particularly relates to an aromatic polycarbonate resin composition that exhibits an excellent surface hardness and strength as well as an excellent designability and lightfastness.

BACKGROUND ART

Aromatic polycarbonate resins are resins that have an excellent heat resistance, excellent mechanical properties, and an excellent dimensional stability and are widely used, for example, as automotive materials, materials for electrical and electronic equipment and devices, housing materials, and materials for the production of parts in other industrial sectors. In recent years, aromatic polycarbonate resins have been aggressively adopted, in particular, for automotive interior parts, casings for various mobile terminal devices, and members for various display devices and equipment. Another property of aromatic polycarbonate resins, on the other hand, is that the aromatic polycarbonate resins are easily scratched, and, as a consequence, there has been strong demand, in the aforementioned sectors, for improvements in this regard.

In response to this, for example, PTL 1 to PTL 3 teach that aromatic polycarbonate resins having a 2,2-bis(4-hydroxy-3-methylphenyl)propane skeleton exhibit an excellent surface hardness.

CITATION LIST

Patent Literature

[PTL 1] JP 2011-105931 A
[PTL 2] JP 2011-105932 A
[PTL 3] JP 2017-052867 A

SUMMARY OF INVENTION

Technical Problem

However, while the aforementioned aromatic polycarbonate resins having a 2,2-bis(4-hydroxy-3-methylphenyl)propane skeleton do exhibit an excellent surface hardness, the aforementioned aromatic polycarbonate resins have the drawback of having a strength and lightfastness inferior to those of general aromatic polycarbonate resins as represented by bisphenol A-based polycarbonates. As a consequence, the safety aspect, product strength, designability, and lightfastness have been matters of concern in the case of potential application to, for example, automotive interior members, casings for various mobile terminals, and display panels, and it has not been possible to achieve suitable uses. In the present invention, designability refers to the initial color of a resin molded article.

As a result, there are well-known examples of efforts to keep a balance between the hardness and strength through the preparation of suitable blends of bisphenol A-based polycarbonate with aromatic polycarbonate resin having a 2,2-bis(4-hydroxy-3-methylphenyl)propane skeleton. However, these compositions have been unable to provide a satisfactory lightfastness as referenced above.

In addition, the incorporation of an ultraviolet absorber in order to improve the lightfastness, in general, has been investigated. However, even when the ultraviolet absorber is blended with an aromatic polycarbonate resin having a 2,2-bis(4-hydroxy-3-methylphenyl)propane skeleton, there is little improvement effect from only the ultraviolet absorber. When a large amount of the ultraviolet absorber is blended in pursuit of a large improvement, the problems of a substantial decline in the color and a decline in the impact resistance occur.

Considering the problems described above, an object of the present invention is to provide an aromatic polycarbonate resin composition that simultaneously exhibits an excellent surface hardness, excellent strength, excellent designability, and excellent lightfastness.

Solution to Problem

As a result of intensive investigations in order to solve the problems described above, the present inventors discovered that, for an aromatic polycarbonate resin composition provided by the incorporation of a prescribed amount of an ultraviolet absorber into an aromatic polycarbonate resin that contains both a 2,2-bis(4-hydroxy-3-methylphenyl)propane skeleton and a 2,2-bis(4-hydroxyphenyl)propane skeleton, an excellent surface hardness and strength can be achieved, and the designability and lightfastness can also be substantially improved, by controlling the 2,2-bis(4-hydroxy-3-methylphenyl)propane skeleton and 2,2-bis(4-hydroxyphenyl)propane skeleton to prescribed proportions and by focusing on the amount of cresolic hydroxy group derived from the 2,2-bis(4-hydroxy-3-methylphenyl)propane and controlling this amount of cresolic hydroxy group into a prescribed range, and the present invention was achieved based on this discovery.

That is, the gist of the present invention resides in the following polycarbonate resin composition.

[1] An aromatic polycarbonate resin composition containing an aromatic polycarbonate resin (A) that contains a carbonate structural unit (X) derived from an aromatic dihydroxy compound represented by formula (1) below and a carbonate structural unit (Y) derived from an aromatic dihydroxy compound represented by formula (2) below in a proportion of (X)/(Y)=10/90 to 40/60 as a molar ratio, wherein an amount of a cresolic hydroxy group derived from the aromatic dihydroxy compound represented by formula (1) of 60 to 160 ppm.

[C1]

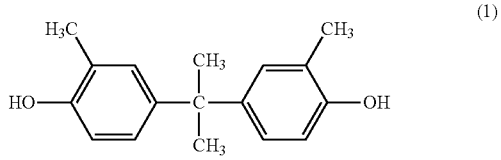

(1)

[C2]

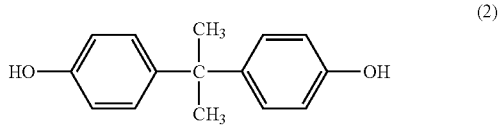

(2)

[2] The polycarbonate resin composition of the above [1], that contains 0.01 to 1.80 mass parts of an ultraviolet absorber (B) per 100 mass parts of the aromatic polycarbonate resin (A).

[3] The aromatic polycarbonate resin composition of the above [1] or [2], wherein the aromatic polycarbonate resin (A) contains an aromatic polycarbonate resin (a1) containing the carbonate structural unit (X) derived from the aromatic dihydroxy compound represented by the formula (1) and contains an aromatic polycarbonate resin (a2) containing the carbonate structural unit (Y) derived from the aromatic dihydroxy compound represented by the formula (2).

[4] The aromatic polycarbonate resin composition of any of the above [1] to [3], wherein an amount of a terminal hydroxy group for the aromatic polycarbonate resin (A) is 100 to 250 ppm.

[5] The aromatic polycarbonate resin composition of any of the above [1] to [4], wherein, for a 500-hour exposure in a xenon lightfastness test in conformity with JASO M346 under conditions of irradiance: 70 W/m$^2$, 300 to 400 nm, BPT temperature: 89±3° C., relative humidity: 50±5%, inner side: quartz filter, outer side: soda lime filter, exposure: continuous, a difference (ΔYI) for a 2 mm-thick plate between YI before the lightfastness test and YI after the lightfastness test, as measured in accordance with ASTM E313, is not more than 2.5.

[6] A molded article containing the aromatic polycarbonate resin composition of any of the above [1] to [5]

[7] The molded article of the above [6], that is a member for a display device, a cover for a display device, protective equipment, or an in-vehicle part.

Advantageous Effects of Invention

The aromatic polycarbonate resin composition according to the present invention can thus provide a composition that has a high surface hardness, strength, and designability and that also has a substantially improved lightfastness.

When applied to automotive interior parts, housings for various mobile terminal devices, or members for various display devices and equipment, the aromatic polycarbonate resin composition according to the present invention is resistant to scratching even during operation and cleaning and also exhibits an excellent product strength and is thus able to maintain a high product value. In addition, when used in an outside environment or when in a sunlit vehicle environment, the aromatic polycarbonate resin composition according to the present invention, because it also has an excellent lightfastness, is resistant to the occurrence of light-induced discoloration and the product value can then be maintained on a long-term basis.

BRIEF DESCRIPTION OF DRAWINGS

FIG. 1 is a flowsheet that shows an example of a production method for the present invention.

DESCRIPTION OF EMBODIMENTS

The present invention is described in detail in the following using embodiments and examples, but the present invention should not be construed as being limited to the embodiments and examples given in the following.

Unless specifically indicated otherwise, in this Description "to" in the specification of a numerical value range is used in the sense of including the numerical values before and after the "to" that are used as the lower limit and upper limit. In addition, and also unless specifically indicated otherwise, "parts" indicates mass parts as based on a mass frame of reference.

The aromatic polycarbonate resin composition according to the present invention contains an aromatic polycarbonate resin (A). The aromatic polycarbonate resin (A) incorporated in the aromatic polycarbonate resin composition according to the present invention is described in detail first.

Aromatic Polycarbonate Resin (A)

The aromatic polycarbonate resin (A) incorporated in the aromatic polycarbonate resin composition according to the present invention characteristically contains at least a carbonate structural unit (X) derived from the aromatic dihydroxy compound represented by the following formula (1) and a carbonate structural unit (Y) derived from the aromatic dihydroxy compound represented by the following formula (2) in a proportion of (X)/(Y)=10/90 to 40/60 as the molar ratio. Through the incorporation in the indicated proportions of this carbonate structural unit (X) derived from the aromatic dihydroxy compound represented by the following formula (1), the surface hardness, strength, and lightfastness of the aromatic polycarbonate resin composition according to the present invention are, for the first time, simultaneously improved.

[C3]

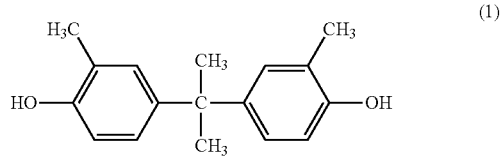

(1)

[C4]

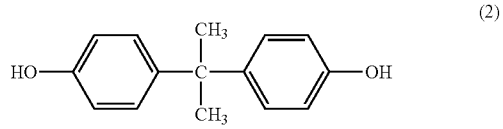

(2)

The surface hardness of the aromatic polycarbonate resin composition according to the present invention declines at a proportion for (X) in the proportion (X)/(Y) between the carbonate structural unit (X) and the carbonate structural unit (Y) below the lower limit (less than 10 mol % with reference to the total with the carbonate structural unit (Y)), which is thus disfavored. Not only the strength and lightfastness of the aromatic polycarbonate resin composition according to the present invention, but also its heat resistance decline at a proportion for (X) above the upper limit (more than 40 mol % with reference to the total with the carbonate structural unit (Y)), which is thus disfavored. Viewed from these perspectives, the proportion (X)/(Y) between the carbonate structural unit (X) and the carbonate structural unit (Y) in the aromatic polycarbonate resin composition according to the present invention is more preferably 12/88 to 38/62, still more preferably 14/86 to 36/64, and even more preferably 15/85 to 35/65.

In addition to the carbonate structural unit (X) derived from the aromatic dihydroxy compound represented by the preceding formula (1) and the carbonate structural unit (Y) derived from the aromatic dihydroxy compound represented by the preceding formula (2), the aromatic polycarbonate (A) used in the aromatic polycarbonate resin composition according to the present invention may contain one or two or more carbonate structural units (Z) derived from an aromatic dihydroxy compound or compounds other than those with formulas (1) and (2). Such an aromatic dihydroxy compound is not particularly limited, and, in order to confer various characteristics, it may be an aromatic dihydroxy compound into which a heteroatom, e.g., N (nitrogen), S (sulfur), P (phosphorus), Si (silicon), and so forth, or a hetero bond has been introduced. Such aromatic dihydroxy compounds can be specifically exemplified by the following:

dihydroxybenzenes, e.g., 1,2-dihydroxybenzene, 1,3-dihydroxybenzene (i.e., resorcinol), and 1,4-dihydroxybenzene; dihydroxybiphenyls, e.g., 2,5-dihydroxybiphenyl, 2,2'-dihydroxybiphenyl, and 4,4'-dihydroxybiphenyl; dihydroxynaphthalenes, e.g., 2,2'-dihydroxy-1,1'-binaphthyl, 1,2-dihydroxynaphthalene, 1,3-dihydroxynaphthalene, 2,3-dihydroxynaphthalene, 1,6-dihydroxynaphthalene, 2,6-dihydroxynaphthalene, 1,7-dihydroxynaphthalene, and 2,7-dihydroxynaphthalene; dihydroxydiaryl ethers, e.g., 2,2'-dihydroxydiphenyl ether, 3,3'-dihydroxydiphenyl ether, 4,4'-dihydroxydiphenyl ether, 4,4'-dihydroxy-3,3'-dimethyldiphenyl ether, 1,4-bis(3-hydroxyphenoxy)benzene, and 1,3-bis(4-hydroxyphenoxy)benzene;

bis(hydroxyaryl)alkanes, e.g., 1,1-bis(4-hydroxyphenyl)propane, 2,2-bis(3-methoxy-4-hydroxyphenyl)propane, 2-(4-hydroxyphenyl)-2-(3-methoxy-4-hydroxyphenyl)propane, 1,1-bis(3-tert-butyl-4-hydroxyphenyl)propane, 2,2-bis(4-hydroxy-3,5-dimethylphenyl)propane, 2,2-bis(3-cyclohexyl-4-hydroxyphenyl)propane, 2-(4-hydroxyphenyl)-2-(3-cyclohexyl-4-hydroxyphenyl)propane, α,α'-bis(4-hydroxyphenyl)-1,4-diisopropylbenzene, 1,3-bis[2-(4-hydroxyphenyl)-2-propyl]benzene, bis(4-hydroxyphenyl)methane, bis(4-hydroxyphenyl)cyclohexylmethane, bis(4-hydroxyphenyl)phenylmethane, bis(4-hydroxyphenyl)(4-propenylphenyl)methane, bis(4-hydroxyphenyl)diphenylmethane, bis(4-hydroxyphenyl)naphthylmethane, 1-bis(4-hydroxyphenyl)ethane, 2-bis(4-hydroxyphenyl)ethane, 1,1-bis(4-hydroxyphenyl)-1-phenylethane, 1,1-bis(4-hydroxyphenyl)-1-naphthylethane, 1-bis(4-hydroxyphenyl)butane, and 2-bis(4-hydroxyphenyl)butane;

bis(hydroxyaryl)cycloalkanes, e.g., 1-bis(4-hydroxyphenyl) cyclopentane, 1-bis(4-hydroxyphenyl)cyclohexane, 4-bis(4-hydroxyphenyl)cyclohexane, 1,1-bis(4-hydroxyphenyl)-3,3-dimethylcyclohexane, 1-bis(4-hydroxyphenyl)-3,4-dimethylcyclohexane, 1,1-bis(4-hydroxyphenyl)-3,5-dimethylcyclohexane, 1,1-bis(4-hydroxyphenyl)-3,3,5-trimethylcyclohexane, 1,1-bis(4-hydroxy-3,5-dimethylphenyl)-3,3,5-trimethylcyclohexane, 1,1-bis(4-hydroxyphenyl)-3-propyl-5-methylcyclohexane, 1,1-bis(4-hydroxyphenyl)-3-tert-butylcyclohexane, 1,1-bis(4-hydroxyphenyl)-3-phenylcyclohexane, and 1,1-bis(4-hydroxyphenyl)-4-phenylcyclohexane; and cardo structure-containing bisphenols such as 9,9-bis(4-hydroxyphenyl)fluorene and 9,9-bis(4-hydroxy-3-methylphenyl)fluorene.

Bis(hydroxyaryl)alkanes are particularly preferred among the preceding from the standpoints of color, impact resistance, and heat resistance.

The carbonate structural unit (Z) derived from dihydroxy compounds other than those with formula (1) and formula (2) may be present in any proportion within a range in which the characteristic features of the aromatic polycarbonate resin composition according to the present invention are not impaired, but is preferably not more than 50 mol % in the total carbonate structural units including the carbonate structural unit (X) and the carbonate structural unit (Y) and is more preferably not more than 40 mol %, still more preferably not more than 30 mol %, particularly preferably not more than 20 mol %, and most preferably not more than 10 mol %.

The proportions in the aromatic polycarbonate resin (A) according to the present invention for the carbonate structural unit (X), carbonate structural unit (Y), and carbonate structural unit (Z) can be readily analyzed using NMR (nuclear magnetic resonance spectroscopy) and HPLC (high-performance liquid chromatography). Analysis is preferably carried out by NMR with selection of a solvent that can dissolve the aromatic polycarbonate resin (A) according to the present invention. However, when a suitable solvent cannot be selected, or when NMR analysis is impeded due to the influence of an additive or another resin, the aromatic polycarbonate resin composition or polycarbonate resin (A) according to the present invention can be hydrolyzed using an alkali, e.g., an aqueous sodium hydroxide solution, and the resulting dihydroxy compounds can also be analyzed by HPLC.

The aromatic polycarbonate resin (A) according to the present invention may be a copolymer containing the carbonate structural unit (X) derived from the aromatic dihydroxy compound represented by formula (1), the carbonate structural unit (Y) derived from the aromatic dihydroxy compound represented by formula (2), and the optional carbonate structural unit (Z) derived from one or two or more dihydroxy compounds other than those with formula (1) and formula (2), or may be a composition (a so-called polymer alloy) composed of an aromatic polycarbonate resin (a1) that contains the carbonate structural unit (X) derived from the aromatic dihydroxy compound represented by formula (1), an aromatic polycarbonate resin (a2) that contains the carbonate structural unit (Y) derived from the aromatic dihydroxy compound represented by formula (2), and optionally an aromatic polycarbonate resin (a3) that contains the carbonate structural unit (Z) derived from one or two or more dihydroxy compounds other than those with formula (1) and formula (2).

The aforementioned aromatic polycarbonate resin (a1) may contain the carbonate structural unit (Y) and the carbonate structural unit (Z) in addition to the carbonate structural unit (X), but the carbonate structural unit (X) is preferably at least 50 mol %, more preferably more than 50 mol %, still more preferably at least 70 mol %, particularly preferably at least 90 mol %, and most preferably 100 mol % (i.e., a homopolymer) of the total carbonate structural units.

The aforementioned aromatic polycarbonate resin (a2) may contain the carbonate structural unit (X) and the carbonate structural unit (Z) in addition to the carbonate structural unit (Y), but the carbonate structural unit (Y) is preferably at least 50 mol %, more preferably more than 50 mol %, still more preferably at least 70 mol %, particularly preferably at least 90 mol %, and most preferably 100 mol % (i.e., a homopolymer) of the total carbonate structural units.

The aromatic polycarbonate resin (a3) may contain the carbonate structural unit (X) and the carbonate structural unit (Y) in addition to the carbonate structural unit (Z), but the carbonate structural unit (Z) is preferably at least 40 mol %, more preferably at least 50 mol %, still more preferably at least 70 mol %, particularly preferably at least 90 mol %, and most preferably 100 mol % (i.e., a homopolymer) of the total carbonate structural units.

Aromatic polycarbonate resin qualifying as the aromatic polycarbonate resin (a1) described above or the aromatic polycarbonate resin (a2) described above is excluded in the preceding from the aromatic polycarbonate resin (a3).

Because this enables additional increases in the surface hardness and flowability of the aromatic polycarbonate resin composition according to the present invention, the aromatic polycarbonate resin (A) used in the aromatic polycarbonate resin composition according to the present invention is preferably composed of the aromatic polycarbonate resin (a1) and aromatic polycarbonate resin (a2) and more preferably is composed of aromatic polycarbonate resin (a1) that is 100 mol % carbonate structural unit (X) (i.e., a homopolymer) and aromatic polycarbonate resin (a2) that is 100 mol % carbonate structural unit (Y) (i.e., a homopolymer).

Method of Aromatic Polycarbonate Resin Production

The aromatic polycarbonate resin (A) and aromatic polycarbonate resins, e.g., aromatic polycarbonate resin (a1) and aromatic polycarbonate resin (a2), contained in the aromatic polycarbonate resin composition according to the present invention may be obtained by purchasing commercially available aromatic polycarbonate resins or may be obtained by production by polycondensation between a carbonate-forming compound and dihydroxy compounds that include the aromatic dihydroxy compounds represented by formulas (1) and (2) and/or another freely selected dihydroxy compound or compounds.

For example, a carbonyl halide or carbonate ester may be used as the carbonate-forming compound. A single carbonate-forming compound may be used or any combination of two or more in any proportions may be used.

The carbonyl halides can be specifically exemplified by phosgene and by haloformates such as the bischloroformates of dihydroxy compounds and the monochloroformates of dihydroxy compounds.

The carbonate esters can be specifically exemplified by compounds with the following formula (3), aryl carbonates, dialkyl carbonates, and the carbonates of dihydroxy compounds, e.g., the biscarbonates of dihydroxy compounds, the monocarbonates of dihydroxy compounds, and cyclic carbonates.

[C5]

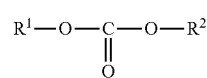

(3)

$R^1$ and $R^2$ in formula (3) each independently represent a $C_{1-30}$ alkyl group or aryl group or arylalkyl group. Below, dialkyl carbonate is used when $R^1$ and $R^2$ are an alkyl group or arylalkyl group, while diaryl carbonate is used when these are aryl groups. From the standpoint of the reactivity with dihydroxy compounds, $R^1$ and $R^2$ are preferably both an aryl group, and the diaryl carbonates represented by the following formula (4) are more preferred.

[C6]

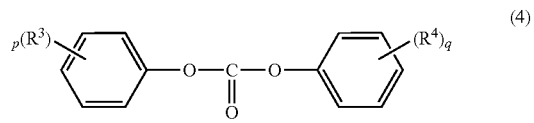

(4)

In formula (4), $R^3$ and $R^4$ are each independently a halogen atom, nitro group, cyano group, $C_{1-20}$ alkyl group, $C_{1-20}$ alkoxycarbonyl group, $C_{4-20}$ cycloalkyl group, or $C_{6-20}$ aryl group, and p and q each independently represent an integer from 0 to 5.

These carbonate esters can be specifically exemplified by dialkyl carbonates, e.g., dimethyl carbonate, diethyl carbonate, and di-t-butyl carbonate, and by (substituted) diaryl carbonates, e.g., diphenyl carbonate (also referred to below as "DPC"), bis(4-methylphenyl) carbonate, bis(4-chlorophenyl) carbonate, bis(4-fluorophenyl) carbonate, bis(2-chlorophenyl) carbonate, bis(2,4-difluorophenyl) carbonate, bis(4-nitrophenyl) carbonate, bis(2-nitrophenyl) carbonate, bis(methylsalicylphenyl) carbonate, and ditolyl carbonate, whereamong diphenyl carbonate is preferred. A single one of these carbonate esters may be used by itself or a mixture of two or more may be used.

An amount of preferably not more than 50 mol % and more preferably not more than 30 mol % of the carbonate ester may be replaced by dicarboxylic acid or dicarboxylate ester. Typical dicarboxylic acids and dicarboxylate esters are, for example, terephthalic acid, isophthalic acid, diphenyl terephthalate, and diphenyl isophthalate. A polyester carbonate is obtained when substitution with such a dicarboxylic acid or dicarboxylate ester is carried out.

These carbonate esters (this includes the dicarboxylic acids and dicarboxylate esters substituted as described above; the same applies in the following) are generally used in polymerization with the dihydroxy compound in excess with respect to the starting dihydroxy compound. That is, the carbonate ester is used in an amount that is 1.01- to 1.30-times (molar ratio) and preferably 1.02- to 1.20-times (molar ratio) the dihydroxy compound.

The aromatic polycarbonate resin (A) according to the present invention and the aromatic polycarbonate resins such as the aromatic polycarbonate resin (a1) and aromatic polycarbonate resin (a2) can be produced by heretofore known polymerization methods, and there is no particular limitation on this polymerization method. The polymerization method can be exemplified by the interfacial polymerization method, melt transesterification method, pyridine method, ring-opening polymerization of cyclic carbonate compounds, and solid-phase transesterification of prepolymer.

The interfacial polymerization method and melt transesterification method, which are particularly favorable polymerization methods among the preceding methods, are specifically described in the following.

Interfacial Polymerization Method

In the interfacial polymerization method, the starting dihydroxy compound and a carbonate-forming compound (preferably phosgene) are reacted in the presence of a reaction-inert organic solvent and an aqueous alkali solution generally while holding the pH at 9 or above, and the aromatic polycarbonate resin is obtained by subsequently carrying out an interfacial polymerization in the presence of a polymerization catalyst. As necessary, the reaction system may contain a molecular weight modifier (terminating agent) and may contain an oxidation inhibitor in order to inhibit oxidation of the dihydroxy compound.

The starting dihydroxy compound and the carbonate-forming compound are as described above. Among carbonate-forming compounds, the use of phosgene is preferred, and when phosgene is used the method is referred to as the phosgene method.

The reaction-inert organic solvent is not particularly limited, and can be exemplified by chlorinated hydrocarbons such as dichloromethane, 1,2-dichloroethane, chloroform, monochlorobenzene, and dichlorobenzene and by aromatic hydrocarbons such as benzene, toluene, and xylene. A single organic solvent may be used or any combination of two or more organic solvents in any proportions may be used.

The alkali compound in the aqueous alkali solution is not particularly limited, and can be exemplified by alkali metal compounds such as sodium hydroxide, potassium hydroxide, lithium hydroxide, and sodium bicarbonate and by alkaline-earth metal compounds, whereamong sodium hydroxide and potassium hydroxide are preferred. A single alkali compound may be used or any combination of two or more alkali compounds in any proportions may be used.

There are no limitations on the concentration of the alkali compound in the aqueous alkali solution, and generally 5 to 10 mass % is used in order to control the pH in the aqueous alkali solution during the reaction to 10 to 12. In addition, for example, in order to control the pH of the aqueous phase to 10 to 12 and preferably 10 to 11 during phosgene injection, the molar ratio between the starting dihydroxy compound and the alkali compound is generally 1: at least 1.9 and preferably 1: at least 2.0 and is generally 1: not more than 3.2 and preferably 1: not more than 2.5.

The polymerization catalyst is not particularly limited, and can be exemplified by aliphatic tertiary amines such as trimethylamine, triethylamine, tributylamine, tripropylamine, and trihexylamine; alicyclic tertiary amines such as N,N'-dimethylcyclohexylamine and N,N'-diethylcyclohexylamine; aromatic tertiary amines such as N,N'-dimethylaniline and N,N'-diethylaniline; quaternary ammonium salts such as trimethylbenzylammonium chloride, tetramethylammonium chloride, and triethylbenzylammonium chloride; pyridine; guanine; and guanidine salts. A single polymerization catalyst may be used or any combination of two or more polymerization catalysts in any proportions may be used.

The molecular weight modifier is not particularly limited, and can be exemplified by monohydric aromatic phenols that have a phenolic hydroxy group, aliphatic alcohols such as methanol and butanol, mercaptan, and phthalimide, among which the aromatic phenols are preferred.

These aromatic phenols can be specifically exemplified by phenol; o-n-butylphenol; m-n-butylphenol; p-n-butylphenol; o-isobutylphenol; m-isobutylphenol; p-isobutylphenol; o-t-butylphenol; m-t-butylphenol; p-t-butylphenol; o-n-pentylphenol; m-n-pentylphenol; p-n-pentylphenol; o-n-hexylphenol; m-n-hexylphenol; p-n-hexylphenol; p-t-octylphenol; o-cyclohexylphenol; m-cyclohexylphenol; p-cyclohexylphenol; o-phenylphenol; m-phenylphenol; p-phenylphenol; o-n-nonylphenol; m-nonylphenol; p-n-nonylphenol; o-cumylphenol; m-cumylphenol; p-cumylphenol; o-naphthylphenol; m-naphthylphenol; p-naphthylphenol; 2,5-di-t-butylphenol; 2,4-di-t-butylphenol; 3,5-di-t-butylphenol; 2,5-dicumylphenol; 3,5-dicumylphenol; p-cresol; bromophenol; tribromophenol; monoalkylphenols having, in the ortho position, meta position, or para position, a straight-chain or branched alkyl group having an average number of carbons of 12 to 35; 9-(4-hydroxyphenyl)-9-(4-methoxyphenyl)fluorene; 9-(4-hydroxy-3-methylphenyl)-9-(4-methoxy-3-methylphenyl)fluorene; and 4-(1-adamantyl) phenol.

Among the preceding, p-t-butylphenol, p-phenylphenol, and p-cumylphenol are preferably used. A single molecular weight modifier may be used or any combination of two or more molecular weight modifiers in any proportions may be used.

The amount of use of the molecular weight modifier is not particularly limited, and can be exemplified by, expressed per 100 moles of the starting dihydroxy compound, generally at least 0.5 moles and preferably at least 1 mole and generally not more than 50 moles and preferably not more than 30 moles. The amount of terminal hydroxy group in the aromatic polycarbonate resin can be adjusted into a favorable range through control of the amount of use of this molecular weight modifier.

Melt Transesterification Method

The production of the aromatic polycarbonate resin according to the present invention by the melt transesterification method is described in the following.

A transesterification reaction, for example, between a carbonate ester and a starting dihydroxy compound, is carried out in the melt transesterification method.

The starting dihydroxy compound and the carbonate ester are as described above.

Any ratio between the starting dihydroxy compound and carbonate ester may be used as long as the desired polycarbonate resin is obtained, but preferably the carbonate ester is used in at least an equimolar amount per 1 mole of the dihydroxy compound, while the use of at least 1.01 moles per 1 mole of the dihydroxy compound is more preferred. The upper limit is generally 1.30 moles or less. Using this range makes it possible to adjust the amount of terminal hydroxy group in the resulting aromatic polycarbonate resin into a suitable range.

A transesterification catalyst is generally used in the production of aromatic polycarbonate resin by the melt transesterification method. There are no particular limitations on the transesterification catalyst, and heretofore known transesterification catalysts can be used. For example, the use of alkali metal compounds and/or alkaline-earth metal compounds is preferred. In combination therewith, for example, a basic compound, e.g., a basic boron compound, basic phosphorus compound, basic ammonium compound, or an amine compound, may also be used on an auxiliary basis. A single transesterification catalyst may be used or any combination of two or more transesterification catalysts in any proportions may be used.

The reaction temperature in the melt transesterification method is not particularly limited, but is generally 100° C. to 320° C. The pressure during the reaction is not particularly limited, but is generally a vacuum of 2 mmHg or below. The specific process may be the execution of a melt polycondensation reaction under the indicated conditions while removing by-products.

A batch regime method or a continuous regime method may be used for the reaction mode. In the case of the batch regime, the mixing sequence for the reaction substrates, reaction medium, catalyst, additives, and so forth may be freely selected as long as the desired aromatic polycarbonate resin is obtained, and the sequence may be freely established as appropriate. The melt polycondensation reaction, however, is preferably carried out using a continuous regime based on a consideration, inter alia, of the stability of the aromatic polycarbonate resin.

A catalyst deactivator may also be used on an optional basis in the melt transesterification method. Any compound that can neutralize the transesterification catalyst can be used as the catalyst deactivator. Examples here are sulfur-containing acidic compounds and their derivatives and phosphorus-containing acidic compounds and their derivatives. A single catalyst deactivator may be used or any combination of two or more catalyst deactivators in any proportions may be used.

The amount of use of the catalyst deactivator is not particularly limited, but, expressed with reference to the alkali metal or alkaline-earth metal present in the transesterification catalyst, is generally at least 0.5 equivalents and preferably at least 1 equivalent and is generally not more than 10 equivalents and is preferably not more than 8 equivalents. In addition, it is, with reference to the aromatic polycarbonate resin, generally at least 1 ppm and generally not more than 100 ppm and preferably not more than 50 ppm.

Molecular Weight of the Aromatic Polycarbonate Resin

The aromatic polycarbonate resin (A) contained in the aromatic polycarbonate resin composition according to the present invention may have any molecular weight in a range in which the characteristic features of the aromatic polycarbonate resin composition according to the present invention are not impaired, but the viscosity-average molecular weight (Mv) converted from the solution viscosity is preferably from 10,000 to 35,000. Having the viscosity-average molecular weight (Mv) be at least the lower limit for the indicated range offers the advantage of providing an excellent impact resistance, while having the viscosity-average molecular weight (Mv) be at or below the upper limit for the indicated range offers the advantage of providing an excellent moldability.

From this standpoint, the molecular weight of the aromatic polycarbonate resin (A) is more preferably 11,000 to 33,000, still more preferably 12,000 to 32,000, particularly preferably 13,000 to 31,000, and most preferably 14,000 to 30,000.

A mixture of two or more aromatic polycarbonate resins having different viscosity-average molecular weights may be used for the aromatic polycarbonate resin (A), in which case mixing may be carried out using aromatic polycarbonate resin having a viscosity-average molecular weight outside the aforementioned preferred range and the viscosity-average molecular weight (Mv) may be controlled into the aforementioned range.

When, in particular, the aromatic polycarbonate resin (A) is composed of the aforementioned aromatic polycarbonate resin (a1) and aromatic polycarbonate resin (a2), with regard to the viscosity-average molecular weight (Mv) of the aromatic polycarbonate resin (a1), the molecular weight of the aromatic polycarbonate resin (a1) is preferably 10,000 to 35,000, more preferably 11,000 to 33,000, still more preferably 12,000 to 32,000, particularly preferably 13,000 to 31,000, and most preferably 14,000 to 30,000. The use of this range has the advantage of providing a good moldability without a loss of mechanical strength.

The molecular weight of the aromatic polycarbonate resin (a2) is preferably 10,000 to 35,000, more preferably 12,000 to 33,000, still more preferably 13,000 to 32,000, particularly preferably 14,000 to 31,000, and most preferably 15,000 to 30,000. The use of this range has the advantage of providing a good moldability without a loss of mechanical strength.

In the present invention, the viscosity-average molecular weight [Mv] of the aromatic polycarbonate resin refers to the value calculated using Schnell's viscosity equation, i.e., $\eta=1.23\times10^{-4}\ Mv^{0.83}$, wherein the intrinsic viscosity [η] (unit: dl/g) is determined at a temperature of 20° C. using methylene chloride as the solvent and using a Ubbelohde viscometer.

The intrinsic viscosity [η] is the value calculated using the following formula and the specific viscosity [ηsp] measured at each solution concentration [C] (g/dl).

$$\eta = \lim_{c \to 0} \eta_{sp}/c \qquad \text{[Math. 1]}$$

Amount of Terminal Hydroxy Group for the Aromatic Polycarbonate Resin (A)

The aromatic polycarbonate resin (A) incorporated in the aromatic polycarbonate resin composition according to the present invention may have any amount of terminal hydroxy group in a range in which the characteristic features of the aromatic polycarbonate resin composition according to the present invention are not impaired, but 50 to 500 mass-ppm (referred to simply as ppm in the following) is preferred. When the amount of terminal hydroxy group is at least as large as the lower limit on the indicated range, this can bring about a greater enhancement in the color and strength of the polycarbonate resin composition according to the present invention. When the upper limit on the indicated range is not exceeded, this has the advantage of enhancing the lightfastness and heat stability of the aromatic polycarbonate resin composition according to the present invention.

From this perspective, the amount of terminal hydroxy group in the aromatic polycarbonate resin (A) according to the present invention is more preferably at least 70 ppm, still more preferably at least 80 ppm, and particularly preferably at least 100 ppm. It is more preferably not more than 400 ppm, still more preferably not more than 300 ppm, and particularly preferably not more than 250 ppm.

A mixture of two or more aromatic polycarbonate resins having different amounts of terminal hydroxy group may be used for the aromatic polycarbonate resin (A) according to the present invention, in which case mixing may be carried out using aromatic polycarbonate resin having an amount of terminal hydroxy group outside the aforementioned preferred range and the amount of terminal hydroxy group may be controlled into the aforementioned range.

The amount of terminal hydroxy group in the aromatic polycarbonate resin (A) according to the present invention refers to the total amount M of terminal hydroxy group represented by the following formula (5), and the unit for the amount of terminal hydroxy group is the mass of the terminal hydroxy groups expressed as ppm with reference to the mass of the aromatic polycarbonate resin. The measurement method here is colorimetric determination by the titanium tetrachloride/acetic acid method (the method described in Macromol. Chem., 88 215 (1965)).

[C7]

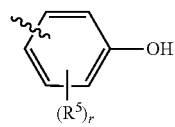

(5)

In formula (5), each $R^5$ is independently a halogen atom, nitro group, cyano group, $C_{1-20}$ alkyl group, $C_{1-20}$ alkoxycarbonyl group, $C_{4-20}$ cycloalkyl group, or $C_{6-20}$ aryl group, and each r independently represents an integer from 0 to 2.

The Amount of Cresolic Hydroxy Group in the Aromatic Polycarbonate Resin (A)

The terminal hydroxy groups on the aromatic polycarbonate resin (A) contained in the aromatic polycarbonate resin composition according to the present invention as described in the preceding necessarily include the phenolic hydroxy group derived from the aromatic dihydroxy compound represented by formula (2) and the cresolic hydroxy group derived from the aromatic dihydroxy compound represented by formula (1).

The cresolic hydroxy group in the aromatic polycarbonate resin (A) contained in the aromatic polycarbonate resin composition according to the present invention is characteristically 60 to 160 ppm. Surprisingly, the lightfastness of the aromatic polycarbonate resin composition according to the present invention is substantially improved by having the amount of cresolic hydroxy group reside in the indicated range, while an excellent strength, color, heat stability, and moist heat stability are also provided.

Viewed from this perspective, the amount of cresolic hydroxy group in the aromatic polycarbonate resin (A) contained in the aromatic polycarbonate resin composition according to the present invention is preferably 61 to 150 ppm, more preferably 65 to 140 ppm, still more preferably 65 to 130 ppm, particularly preferably 65 to 120 ppm, and most preferably 65 to 110 ppm.

A mixture of two or more aromatic polycarbonate resins having different amounts of cresolic hydroxy group may be used for the aromatic polycarbonate resin (A) according to the present invention, in which case mixing may be carried out using aromatic polycarbonate resin having an amount of cresolic hydroxy group outside the aforementioned preferred range and the amount of cresolic hydroxy group may be controlled into the aforementioned range.

The amount of cresolic hydroxy group for the aromatic polycarbonate resin (A) according to the present invention can be determined by calculating the proportions for the amount of cresolic hydroxy group and the amount of non-cresolic hydroxy group (amount of phenolic hydroxy group) using NMR analysis and multiplying the total amount M of terminal hydroxy group with formula (5) by the proportion calculated for the amount of cresolic hydroxy group.

The amount of terminal hydroxy group in the aromatic polycarbonate resin (A) contained in the aromatic polycarbonate resin composition according to the present invention, in the polycarbonate resin (a1), and in the polycarbonate resin (a2) can be adjusted into the aforementioned range using any known method. For example, when the aromatic polycarbonate resin is produced by polycondensation using a transesterification reaction, the amount of terminal hydroxy group can be adjusted into the aforementioned range by adjusting, e.g., the mixing ratio between the carbonate ester and dihydroxy compound and the degree of pressure reduction during the transesterification reaction. These procedures can also be used to adjust the molecular weight of the resulting polycarbonate resin.

The mixing ratio is as described above when the amount of terminal hydroxy group is adjusted by adjusting the mixing ratio between the carbonate ester and the dihydroxy compound.

In addition, in a more aggressive adjustment method a separate admixture of the terminating agent may be carried out during the reaction. The terminating agent here can be exemplified by monohydric phenols, monobasic carboxylic acids, and carbonate diesters. A single terminating agent may be used or any combination of two or more terminating agents in any proportions may be used.

When the polycarbonate resin according to the present invention is produced by interfacial polymerization, the amount of terminal hydroxy group can be freely adjusted by adjusting the amount of addition of the molecular weight modifier (terminating agent).

Ultraviolet Absorber (B)

The aromatic polycarbonate resin composition according to the present invention preferably contains an ultraviolet absorber (B) in combination with the aromatic polycarbonate resin (A) described in the preceding. An aromatic polycarbonate resin composition having a high lightfastness can be obtained when the aromatic polycarbonate resin (A) is combined with an ultraviolet absorber (B). However, it must be made clear that the novel occurrence of this unusually high lightfastness is made possible by the combination of the ultraviolet absorber (B) with the aromatic polycarbonate resin (A) for which prescribed ranges are provided for both the amount of cresolic hydroxy group and the proportion between the carbonate structural unit (X) and the carbonate structural unit (Y).

The ultraviolet absorber can be exemplified by inorganic ultraviolet absorbers such as cerium oxide and zinc oxide and by organic ultraviolet absorbers such as benzotriazole compounds, triazine compounds, benzophenone compounds, salicylate compounds, cyanoacrylate compounds, oxanilide compounds, and malonate ester compounds. Among the preceding, organic ultraviolet absorbers are preferred and benzotriazole compounds and triazine compounds are more preferred. The aromatic polycarbonate resin composition according to the present invention may be provided with a good transparency and good mechanical properties through selection of an organic ultraviolet absorber.

The benzotriazole compounds can be specifically exemplified by 2-(2'-hydroxy-5'-methylphenyl)benzotriazole, 2-[2'-hydroxy-3',5'-bis(α,α-dimethylbenzyl)phenyl]benzotriazole, 2-(2'-hydroxy-3',5'-di-tert-butylphenyl)benzotriazole, 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole, 2-(2'-hydroxy-3',5'-di-tert-amyl)benzotriazole, 2-(2'-hydroxy-5'-tert-octylphenyl)benzotriazole, and 2,2'-methylenebis[4-(1,1,3,3-tetramethylbutyl)-6-(2-N-benzotriazol-2-yl)phenol], among which 2-(2'-hydroxy-5'-tert-octylphenyl)benzotriazole and 2,2'-methylenebis[4-(1,1,3,3-tetramethylbutyl)-6-(2-N-benzotriazol-2-yl)phenol] are preferred and 2-(2'-hydroxy-5'-tert-octylphenyl)benzotriazole is particularly preferred.

These benzotriazole compounds can be specifically exemplified by "SEESORB 701", "SEESORB 705", "SEESORB 703", "SEESORB 702", "SEESORB 704", and "SEESORB 709" from Shipro Kasei Kaisha, Ltd.; "Biosorb 520", "Biosorb 582", "Biosorb 580", and "Biosorb 583" from Kyodo Chemical Co., Ltd.; "Chemisorb 71" and "Chemisorb 72" from Chemipro Kasei Kaisha, Ltd.; "CYASORB UV5411" from Cytec Industries, Inc.; "LA-32", "LA-38", "LA-36", "LA-34", and "LA-31" from the ADEKA Corporation; and "Tinuvin P", "Tinuvin 234", "Tinuvin 326", "Tinuvin 327", and "Tinuvin 328" from BASF.

The triazine compounds can be specifically exemplified by compounds represented by the following general formula (6).

[C8]

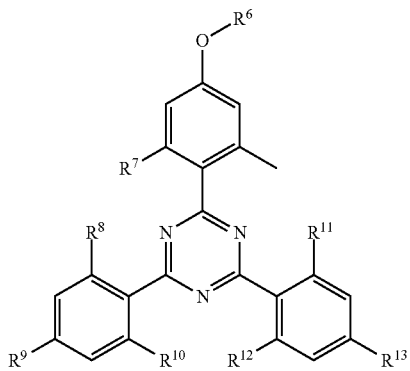

(6)

The $R^6$ in formula (6) represents a $C_{1-30}$ hydrocarbon group. This $C_{1-30}$ hydrocarbon group can be exemplified by $C_{1-30}$ alkyl groups, aryl groups, and arylalkyl groups, which may be straight chain, branched chain, or cyclic. In addition, the skeleton may contain a residue, e.g., an ether residue (—O—), ester residue (—COO—), carbonyl residue (—CO—), amide residue (—CONH—), imide residue (—CONRCO—), or thiosulfide residue (—S—), and may have a substituent, e.g., the hydroxy group (—OH), cyano group (—CN), nitro group (—NO2), or carboxy group (—COOH).

The $C_{1-30}$ alkyl groups can be exemplified by the methyl group, ethyl group, propyl group, isopropyl group, butyl group, tert-butyl group, pentyl group, hexyl group, cyclohexyl group, octyl group, and octyldodecyl group. These preferably have an ether residue (—O—) or ester residue (—COO—). Substitution by the hydroxy group (—OH) is also preferred. The presence of this ether residue, ester residue, and/or hydroxy group tends to provide improvement in the heat resistance of the triazine ultraviolet absorbers of the present invention and also tends to provide improvement in the compatibility with aromatic polycarbonate resins and improvement in the residence heat stability of the aromatic polycarbonate resin according to the present invention.

The $C_{1-30}$ aryl groups can be exemplified by the phenyl group, naphthyl group, biphenyl group, and terphenyl group. The $C_{1-30}$ arylalkyl groups can be exemplified by the benzyl group. The aromatic ring in the, e.g., phenyl group, naphthyl group, biphenyl group, terphenyl group, benzyl group, and so forth, may be partially substituted by an alkyl group, e.g., the methyl group, ethyl group, propyl group, butyl group, and so forth, and/or by an alkoxy group, e.g., the methoxy group, ethoxy group, propoxy group, butoxy group, and so forth.

The $R^7$, $R^8$, $R^9$, $R^{10}$, $R_{11}$, $R^{12}$, and $R^{13}$ in formula (6) represent at least one selection from the group consisting of a hydrogen atom, halogen atom, hydroxy group, and $C_{1-30}$ hydrocarbon groups.

The halogen atom here can be exemplified by the fluorine atom, chlorine atom, and bromine atom. The incorporation of such a halogen atom tends to provide improvement in the heat resistance of the hydroxyphenyltriazine ultraviolet absorbers of the present invention, and in addition mainly shifts the ultraviolet absorption characteristics to the longer wavelength side and tends to provide additional improvement in the weather resistance of the aromatic polycarbonate resin composition according to the present invention.

The $C_{1-30}$ hydrocarbon groups here are the same as described for the $C_{1-30}$ hydrocarbon groups in relation to $R^6$.

These triazine ultraviolet absorbers can be exemplified by "LA-46" from the ADEKA Corporation and by "Tinuvin 1577ED", "Tinuvin 400", "Tinuvin 405", "Tinuvin 460", "Tinuvin 477-DW", and "Tinuvin 479" from BASF.

The benzophenone compounds can be specifically exemplified by 2,4-dihydroxybenzophenone, 2-hydroxy-4-methoxybenzophenone, 2-hydroxy-4-methoxybenzophenone-5-sulfonic acid, 2-hydroxy-4-n-octoxybenzophenone, 2-hydroxy-n-dodecyloxybenzophenone, bis(5-benzoyl-4-hydroxy-2-methoxyphenyl)methane, 2,2'-dihydroxy-4-methoxybenzophenone, and 2,2'-dihydroxy-4,4'-dimethoxybenzophenone. These benzophenone compounds can be specifically exemplified by "SEESORB 100", "SEESORB 101", "SEESORB 101S", "SEESORB 102", and "SEESORB 103" from Shipro Kasei Kaisha, Ltd.; "Biosorb 100", "Biosorb 110", and "Biosorb 130" from Kyodo Chemical Co., Ltd.; "Chemisorb 10", "Chemisorb 11", "Chemisorb 11S", "Chemisorb 12", "Chemisorb 13", and "Chemisorb 111" from Chemipro Kasei Kaisha, Ltd.; "Uvinul 400", "Uvinul M-40", and "Uvinul MS-40" from BASF; "CYASORB UV9", "CYASORB UV284", "CYASORB UV531", and "CYASORB UV24" from Cytec Industries, Inc.; and "ADK STAB 1413" and "ADK STAB LA-51" from the ADEKA Corporation.

The salicylate compounds can be specifically exemplified by phenyl salicylate and 4-tert-butylphenyl salicylate, and these salicylate compounds can be specifically exemplified by "SEESORB 201" and "SEESORB 202" from Shipro Kasei Kaisha, Ltd., and "Chemisorb 21" and "Chemisorb 22" from Chemipro Kasei Kaisha, Ltd.

The cyanoacrylate compounds can be specifically exemplified by ethyl 2-cyano-3,3-diphenylacrylate and 2-ethylhexyl 2-cyano-3,3-diphenylacrylate, and these cyanoacrylate compounds can be specifically exemplified by "SEESORB 501" from Shipro Kasei Kaisha, Ltd., "Biosorb 910" from Kyodo Chemical Co., Ltd., "Uvisolator 300" from Daiichi-Kasei Co., Ltd., and "Uvinul N-35" and "Uvinul N-539" from BASF.

The oxanilide compounds can be specifically exemplified by 2-ethoxy-2'-ethyloxalic acid bisanilide, and this oxanilide compound can be specifically exemplified by "Sanduvor VSU" from Clariant.

The malonate ester compounds are preferably 2-(alkylidene)malonate esters and more preferably are 2-(1-arylalkylidene)malonate esters. These malonate ester compounds can be specifically exemplified by "PR-25" from Clariant and "B-CAP" from BASF.

When an ultraviolet absorber (B) is used, its content, per 100 mass parts of the polycarbonate resin (A), is at least 0.01 mass parts, preferably at least 0.05 mass parts, more preferably at least 0.10 mass parts, still more preferably at least 0.15 mass parts, and particularly preferably at least 0.20 mass parts. This is not more than 1.80 mass parts, preferably not more than 1.50 mass parts, more preferably not more than 1.20 mass parts, still more preferably not more than 1.00 mass part, and particularly preferably not more than 0.80 mass parts.

When the content of the ultraviolet absorber (B) is at or below the lower limit of the indicated range, an inadequate lightfastness-improving effect readily occurs. When the ultraviolet absorber content exceeds the upper limit on the indicated range, not only does the lightfastness-improving effect plateau, but e.g., mold deposits are produced and mold contamination tends to occur. A single ultraviolet absorber (B) may be used or any combination of two or more in any proportions may be used.

Light Stabilizers

In order to enhance the lightfastness, the aromatic polycarbonate resin composition according to the present invention preferably also contains a light stabilizer different from the ultraviolet absorber (B). Hindered amine light stabilizers are preferred for the light stabilizer. Hindered amine light stabilizers can be exemplified by 4-benzoyloxy-2,2,6,6-tetramethylpiperidine, 4-hexanoyloxy-2,2,6,6-tetramethylpiperidine, 4-octanoyloxy-2,2,6,6-tetramethylpiperidine, 4-stearoyloxy-2,2,6,6-tetramethylpiperidine, bis(2,2,6,6-tetramethylpiperidyl) succinate, bis(2,2,6,6-tetramethylpiperidyl) sebacate, bis(1,2,2,6,6-pentamethyl-4-piperidyl) sebacate, 8-acetyl-3-dodecyl-7,7,9,9-tetramethyl-1,3,8-triazaspiro[4,5]decane-2,4-dione, N-methyl-3-dodecyl-1-(-2,2,6,6-tetramethyl-4-piperidinyl)pyrrolidine-2,5-dione, N-acetyl-3-dodecyl-1-(2,2,6,6-tetramethyl-4-piperidine), and tris(2,2,6,6-tetramethyl-4-piperidyl) trimesate.

A single light stabilizer may be used or any combination of two or more in any proportions may be used.

Heat Stabilizers

The polycarbonate resin composition according to the present invention preferably also contains a heat stabilizer in order to prevent, during, e.g., molding and so forth, a reduction in the molecular weight and/or a deterioration in the transparency.

Phosphorus heat stabilizers and hindered phenolic heat stabilizers are preferred for the heat stabilizer.

The phosphorus heat stabilizers can be exemplified by phosphorous acid, phosphoric acid, phosphorous acid, and phosphonic acid and by their esters. Specific examples are triphenyl phosphite, tris(nonylphenyl) phosphite, tris(2,4-di-tert-butylphenyl) phosphite, tridecyl phosphite, trioctyl phosphite, trioctadecyl phosphite, didecyl monophenyl phosphite, dioctyl monophenyl phosphite, diisopropyl monophenyl phosphite, monobutyl diphenyl phosphite, monodecyl diphenyl phosphite, monooctyl diphenyl phosphite, bis(2,6-di-tert-butyl-4-methylphenyl)pentaerythritol diphosphite, 2,2-methylenebis(4,6-di-tert-butylphenyl) octyl phosphite, bis(nonylphenyl)pentaerythritol diphosphite, bis(2,4-di-tert-butylphenyl)pentaerythritol diphosphite, distearylpentaerythritol diphosphite, tributyl phosphate, triethyl phosphate, trimethyl phosphate, triphenyl phosphate, diphenyl mono-ortho-xenyl phosphate, dibutyl phosphate, dioctyl phosphate, diisopropyl phosphate, tetrakis(2,4-di-tert-butylphenyl) 4,4'-biphenylenediphosphophinate, dimethyl benzenephosphonate, diethyl benzenephosphonate, and dipropyl benzenephosphonate.

The hindered phenolic heat stabilizers can be exemplified by pentaerythritol tetrakis(3-(3,5-di-t-butyl-4-hydroxyphenyl)propionate), octadecyl 3-(3,5-di-tert-butyl-4-hydroxyphenyl)propionate, thiodiethylene bis(3-(3,5-di-tert-butyl-4-hydroxyphenyl)propionate), and pentaerythritol tetrakis(3-(3,5-dineopentyl-4-hydroxyphenyl)propionate).

Pentaerythritol tetrakis(3-(3,5-di-tert-butyl-4-hydroxyphenyl)propionate) and octadecyl 3-(3,5-di-tert-butyl-4-hydroxyphenyl)propionate are preferred among the preceding. These two hindered phenolic heat stabilizers are commercially available from BASF under the names "Irganox 1010" and "Irganox 1076".

Mold-Release Agents

The polycarbonate resin composition according to the present invention preferably also contains a mold-release agent. The mold-release agent can be exemplified by aliphatic carboxylic acids, fatty acid esters between an aliphatic carboxylic acid and an alcohol, aliphatic hydrocarbon compounds having a number-average molecular weight of 200 to 15,000, and polysiloxane-type silicone oils. Fatty acid esters between an aliphatic carboxylic acid and an alcohol are particularly preferred among these.

The aliphatic carboxylic acid constituting the fatty acid ester can be exemplified by saturated or unsaturated monobasic, dibasic, or tribasic aliphatic carboxylic acids. The aliphatic carboxylic acid here also encompasses alicyclic carboxylic acids. Among these, preferred aliphatic carboxylic acids are monobasic or dibasic carboxylic acids having 6 to 36 carbons, while saturated monobasic aliphatic carboxylic acids having 6 to 36 carbons are more preferred. Specific examples of these aliphatic carboxylic acids are palmitic acid, stearic acid, caproic acid, capric acid, lauric acid, arachidic acid, behenic acid, lignoceric acid, cerotic acid, melissic acid, montanic acid, tetratriacontanoic acid, adipic acid, and azelaic acid.

The alcohol constituting the fatty acid ester can be exemplified by saturated or unsaturated monohydric alcohols and saturated or unsaturated polyhydric alcohols. This alcohol may bear a substituent such as a fluorine atom or aryl group. Monohydric or polyhydric saturated alcohols having not more than 30 carbons are preferred among these alcohols, with saturated aliphatic monohydric alcohols and polyhydric alcohols having not more than 30 carbons being more preferred. Here, aliphatic also encompasses alicyclic compounds. Specific examples of the subject alcohols are octanol, decanol, dodecanol, stearyl alcohol, behenyl alcohol, ethylene glycol, diethylene glycol, glycerol, pentaerythritol, 2,2-dihydroxyperfluoropropanol, neopentylene glycol, ditrimethylolpropane, and dipentaerythritol.

The aliphatic carboxylic acid/alcohol fatty acid ester can be specifically exemplified by beeswax (a mixture in which the major component is myristyl palmitate), stearyl stearate, behenyl behenate, stearyl behenate, glycerol monopalmitate, glycerol monostearate, glycerol distearate, glycerol tristearate, pentaerythritol monopalmitate, pentaerythritol monostearate, pentaerythritol distearate, pentaerythritol tristearate, and pentaerythritol tetrastearate. Among the preceding, the use of at least one mold-release agent selected from pentaerythritol tetrastearate, stearyl stearate, and glycerol monostearate is more preferred.

The polycarbonate resin composition according to the present invention may also optionally contain, insofar as its desired properties are not significantly impaired, components in addition to those described above. These additional components can be exemplified by resins other than the aromatic polycarbonate resin (A), various resins additives, and so forth. A single additional component may be incorporated or any combination of two or more in any proportions may be incorporated.

Resins other than the aromatic polycarbonate resin (A) can be exemplified by aliphatic polycarbonate resins, thermoplastic polyester resins, e.g., polyethylene terephthalate, polytrimethylene terephthalate, and polybutylene terephthalate; styrenic resins such as polystyrene, high-impact polystyrene (HIPS), and acrylonitrile-styrene copolymers (AS resin); polyolefin resins such as polyethylene and polypropylene; polyamide resins; polyimide resins; polyetherimide resins; polyurethane resins; polyphenylene ether resins; polyphenylene sulfide resins; polysulfone resins; and polymethacrylate resins.

A single additional resin may be incorporated or any combination of two or more in any proportions may be incorporated.

When additional resin other than the aromatic polycarbonate resin (A) is incorporated, its content, per 100 mass parts of the aromatic polycarbonate resin (A), is preferably not more than 20 mass parts, more preferably not more than 10 mass parts, even more preferably not more than 5 mass parts, and particularly preferably not more than 3 mass parts.

The resin additives can be exemplified by flame retardants, static inhibitors, antifogging agents, lubricants, anti-blocking agents, fluidity improvers, plasticizers, dispersing agents, antiseptics, dyes, pigments, and so forth. A single one of these resin additives may be incorporated or any combination of two or more in any proportions may be incorporated.

Method for Producing the Aromatic Polycarbonate Resin Composition

There are no limitations on the method for producing the aromatic polycarbonate resin composition according to the present invention, and the known methods for producing aromatic polycarbonate resin compositions can be broadly used.

In a specific example, the optionally incorporated ultraviolet absorber (B) and additional components are preliminarily mixed, using any of various mixers, e.g., a tumbler or Henschel mixer, into the aromatic polycarbonate resin (A), followed by melt-kneading using a mixer such as a Banbury mixer, roll, Brabender, single-screw kneading extruder, twin-screw kneading extruder, or kneader.

The aromatic polycarbonate resin composition according to the present invention may also be produced, for example, without preliminarily blending the individual components, or with a preliminary blending of only a portion of the components, and carrying out melt-kneading while feeding the extruder using a feeder.

In addition, during the production of the aromatic polycarbonate resin according to the present invention, additives may be directly added to and kneaded with the resin melt after the completion of polymerization. In a preferred method for such an addition, the resin melt is directly introduced into an extruder after the completion of polymerization, the additives are blended, and melt-kneading and pelletizing are carried out.

For example, a portion of the components may be preliminarily blended, supplied to an extruder, and melt-kneaded to provide a resin composition used as a masterbatch. This masterbatch is again blended with the remainder of the components followed by melt-kneading to produce the polycarbonate resin composition according to the present invention.

Moreover, when, for example, a hard-to-disperse component is to be blended, the dispersity can be enhanced by preliminarily dissolving or dispersing this hard-to-disperse component in a solvent, e.g., water, an organic solvent, and so forth, and carrying out kneading using the resulting solution or dispersion.

The aromatic polycarbonate resin composition according to the present invention has an excellent lightfastness and can thus provide a small difference $\Delta YI$ between the pre-test yellowness index and the post-test yellowness index in a lightfastness test.

That is, the difference $\Delta YI$ between the pre-test yellowness index YI and the post-test yellowness index YI of a 2 mm-thick plate, as-measured in accordance with ASTM E313 after a 500-hour exposure in a xenon lightfastness test in conformity with JASO M346 under conditions of irradiance: 70 W/m$^2$ (300 to 400 nm), BPT temperature: 89±3° C., relative humidity: 50±5%, inner side: quartz filter, outer side: soda lime filter, and continuous exposure, can be brought to not more than 3.5, more preferably not more than 3.0, and still more preferably not more than 2.5.

Molded Articles

Molded articles can be obtained from the aromatic polycarbonate resin composition according to the present invention by melt processing. These molded articles are preferably molded articles obtained by injection molding or extrusion molding.

There are no limitations on the shape, design, color, dimensions, and so forth of the molded articles according to the present invention, and these can be selected as appropriate in accordance with the application for the molded article. Examples are molded articles having various shapes, e.g., molded articles in the shape of a board, plate, rod, sheet, film, cylinder, ring, circle, oval, polygon, profile, hollow article, frame, box, panel, and so forth, and molded articles having specialty shapes and so forth. Additional examples are molded articles that have peaks and valleys on the surface and molded articles with three-dimensional shapes having three-dimensionally curved surfaces.

The method for producing the molded article is not particularly limited, and any of the molding methods commonly used with polycarbonate resins can be adopted. Examples here are injection molding methods, ultrahigh speed injection molding methods, injection compression molding methods, two-color molding methods, hollow molding methods such as gas-assisted moldings, molding methods using insulated molds, molding methods using rapidly heated molds, foam molding (also including molding methods using supercritical fluids), insert molding, IMC (in-mold coating molding) molding methods, extrusion molding methods, sheet molding methods, thermoforming methods, rotational molding methods, laminate molding methods, press molding methods, blow molding methods, and so forth. Molding methods that use a hot runner system may also be used.

The molded articles themselves are suitably used, for example, for members for display devices and covers for display devices, protective equipment, in-vehicle parts, monolayer sheets, and multilayer sheets.

The members for display devices can be exemplified by the component members of various display devices (liquid crystal panels, touch panels), and the covers for display devices can be exemplified by protective covers and front panels for various display devices as well as for multifunctional mobile devices, smartphones, PDAs, tablet terminals, and personal computers, and, for example, the covers and so forth for the display components of next-generation power meters.

The protective equipment can be exemplified by face coverings (face guards) for, for example, helmets, and by transparent sheets.

The in-vehicle parts can be exemplified by glazing, plastic windows, head lamp lenses, front (external) members and housings for car navigation displays (car audio, car AV, and so forth), and automotive interior parts such as front members for consoles, center clusters, and instrument clusters.

The monolayer sheets and multilayer sheets provided by monolayer or multilayer extrusion molding are suitable for applications that require hardness, impact resistance, and transparency (for example, members of liquid crystal display devices, transparent sheets, building materials).

EXAMPLES

The present invention is described in detail in the following using embodiments and examples, but the present invention is not limited to the embodiments and examples given in the following and can be executed using any of various modifications within a range in which there is no departure from the essential features of the present invention.

Production of Aromatic Polycarbonate Resin (a1)

An embodiment that is an example of a method for producing aromatic polycarbonate resin for the present invention will be described with reference to FIG. 1.

FIG. 1 is a flowsheet that shows an example of a production method for the present invention. In the FIGURE, 1 is a storage tank for DPC (diphenyl carbonate), 2 is a stirring blade, 3 is an aromatic dihydroxy compound hopper, 4a, 4b are starting material mixing tanks, 5 is a DPC metering valve, 6 is a metering valve for the aromatic dihydroxy compound, 7 is a pump, 8 is a catalyst metering valve, 10 is a pump, 11 is a catalyst storage tank, 12 is a by-product discharge pipe, 13a, 13b, 13c are vertical polymerization tanks, 14 is a stirring blade, 15 is a horizontal polymerization tank, and 16 is a stirring blade.

Production of Aromatic Polycarbonate Resins (a1-1) to (a1-5)

A DPC melt adjusted to 140° C. under a nitrogen gas atmosphere was continuously fed from the DPC storage tank (1), and 2,2-bis(4-hydroxy-3-methylphenyl)propane (hereinbelow, BPC) was also continuously fed from the aromatic dihydroxy compound hopper (3), at the molar ratio (DPC/BPC) given in Table 1 below into a starting material mixing tank (4a) adjusted to 140° C. under a nitrogen atmosphere. The starting material mixture was then continuously fed to a starting material mixing tank (4b) and, via the pump (7), to a first vertical polymerization tank (13a). On the other hand, at the same time as the start of the feed of this mixture, a 2 mass % aqueous cesium carbonate solution functioning as the catalyst was quantitatively continuously fed through a catalyst introduction line so as to provide 3.5 μmol per 1 mol BPC.

A certain liquid level was maintained at the first vertical polymerization tank (13a) so as to provide a temperature of 215° C. and a pressure of 11 kPa, and the polymerization liquid discharged according to this assumption was continuously successively fed to the second and third vertical polymerization tanks and the fourth horizontal polymerization tank. The reaction was carried out under the following reaction conditions: a temperature of 250° C. and a pressure of 3 kPa at the second polymerization tank (13b), a temperature of 268° C. and a pressure of 100 Pa at the third polymerization tank (13c), and a temperature of 280° C. and a pressure of 50 to 200 Pa (controlled as appropriate to match the target molecular weight) at the fourth polymerization tank (15). The phenol produced as a by-product during the reaction was removed through the by-product discharge pipe (12).

The aromatic polycarbonate resin taken off from the polymer discharge port at the bottom of the fourth polymerization tank was introduced, as such in its melt state, into a twin-screw extruder equipped with three-stage vent ports, butyl-p-toluenesulfonate was added in an amount that was four-fold on a molar basis with respect to the theoretical amount for catalyst neutralization, devolatilization was performed, and pelletization was then carried out.

The following Table 1 provides the DPC/BPC molar ratio and the viscosity-average molecular weight and amount of cresolic hydroxy group for the obtained aromatic polycarbonate resins (a1-1) to (a1-5).

TABLE 1

|  | Designation | DPC/BPC molar ratio | Viscosity-average molecular weight $M_v$ | Amount of cresolic hydroxy group (ppm) |
|---|---|---|---|---|
| Aromatic PC resin (a1) | a1-1 | 1.078 | 20400 | 140 |
|  | a1-2 | 1.074 | 20400 | 200 |
|  | a1-3 | 1.068 | 20100 | 290 |
|  | a1-4 | 1.053 | 20600 | 510 |
|  | a1-5 | 1.033 | 20000 | 800 |

The components given in the following Table 2 were used as the aromatic polycarbonate resin (a2) and the ultraviolet absorber (B).

TABLE 2

| Component | Designation |  | Amount of phenolic hydroxy group (ppm) | Amount of cresolic hydroxy group (ppm) |
|---|---|---|---|---|
| Aromatic PC resin (a2) | a2-1 | Aromatic polycarbonate resin produced by interfacial polymerization using bisphenol A as a starting material $M_v$: 22,000 | 120 | 0 |
|  | a2-2 | aromatic polycarbonate resin produced by interfacial polymerization using bisphenol A as a starting material $M_v$: 16,000 | 120 | 0 |

TABLE 2-continued

| Component | Designation | | Amount of phenolic hydroxy group (ppm) | Amount of cresolic hydroxy group (ppm) |
|---|---|---|---|---|
| Ultraviolet absorber (B) | B1 | benzotriazole ultraviolet absorber 2-(2'-hydroxy-5'-tert-octylphenyl)benzotriazole product name "SEESORB 709" from Shipro Kasei | | |

Examples 1 to 8 and Comparative Examples 1 to 5

The components indicated above were blended in the proportions (mass parts) given in Table 3 below, mixed for 20 minutes with a tumbler, and then melt-kneaded at a cylinder temperature of 280° C. using a twin-screw extruder ("TEX30α" from The Japan Steel Works, Ltd.), and pellets of a polycarbonate resin material were obtained by strand cutting.

Evaluation of the Lightfastness

The pellets obtained as described above were dried for 6 hours at 100° C., followed by injection molding using an injection molder (SE50DUZ from Sumitomo Heavy Industries, Ltd.) at a cylinder temperature of 280° C. and a mold temperature of 70° C. to mold a flat plate test specimen (60 mm×60 mm×2 mm thickness).
Using the flat plate test specimen and a xenon weatherometer (Atlas Ci4000), a 500-hour exposure in a xenon lightfastness test was performed in conformity with JASO M346 using conditions of irradiance: 70 W/m² (300 to 400 nm), BPT temperature: 89±3° C., relative humidity: 50±5%, inner side: quartz filter, outer side: soda lime filter, and exposure: continuous. The difference ΔYI between the yellowness index YI of the 2 mm-thick plate and the initial YI before the test, measured in accordance with ASTM E313, was determined.
Measurement of the YI color was performed by the transmission method using an SE6000 spectrophotometer from Nippon Denshoku Industries Co., Ltd. set to the C illuminant and 2° field of view.

Charpy Impact Strength

The pellets obtained as described above were dried for 6 hours at 100° C. using a convection dryer and were then fabricated into a 3 mm-thick impact-resistance test specimen based on ISO 179-1, 2 using an injection molder ("J55AD" from The Japan Steel Works, Ltd.) and conditions of a cylinder temperature: 280° C., mold temperature: 70° C., and molding cycle: 45 seconds. The notched Charpy impact strength (unit: kJ/m²) was measured using the obtained test specimen in a 23° C. temperature environment.

Pencil Hardness

The surface hardness of the flat plate test specimen (60 mm×60 mm×2 mm thickness) obtained as described above was determined in accordance with JIS K 5600-5-4 using a pencil hardness tester (Toyo Seiki Seisaku-sho, Ltd.) and a load of 1,000 g.

Overall Evaluation

An evaluation was rendered as follows based on the results obtained as described in the preceding for the initial YI value, ΔYI value, Charpy impact strength, and pencil hardness.
A: All of the following are satisfied: the initial YI value is not greater than 1.0; the value of ΔYI is not greater than 1.5; and the Charpy impact strength is at least 3.0.
B: Not compliant with the aforementioned A and not compliant with the C described below.
C: Any of the following applies: two or more of the conditions in A are not satisfied; the value of the initial YI is 1.5 or more; the value of ΔY exceeds 2.5; or the pencil hardness is B or below.
These results are given in Table 3 below.

TABLE 3

| | | Example | | | | | | | | Comparative Example | | | | |
|---|---|---|---|---|---|---|---|---|---|---|---|---|---|---|
| | | 1 | 2 | 3 | 4 | 5 | 6 | 7 | 8 | 1 | 2 | 3 | 4 | 5 |
| Aromatic PC resin (a1) | a1-1 | | | | | | | | | | | 40 | | |
| | a1-2 | 30 | | | | | | | | | 45 | | | |
| | a1-3 | | 30 | | | | 40 | 40 | 40 | | | | | 40 |
| | a1-4 | | | 30 | 15 | 15 | | | | | | | 40 | |
| | a1-5 | | | | | | | | | 10 | | | | |
| Aromatic PC resin (a2) | a2-1 | 70 | 70 | 70 | 85 | | 60 | 60 | 60 | 90 | 55 | 60 | 60 | 60 |
| | a2-2 | | | | | 85 | | | | | | | | |
| Ultraviolet absorber (B) | B1 | 0.3 | 0.3 | 0.3 | 0.3 | 0.3 | 0.3 | 0.9 | 1.5 | 0.3 | 0.3 | 0.3 | 0.3 | 2.0 |
| Carbonate structural unit (X) (mol %) | | 28 | 28 | 28 | 13 | 13 | 38 | 38 | 38 | 8 | 42 | 38 | 38 | 38 |
| Amount of cresolic hydroxy group (ppm) | | 60 | 87 | 153 | 77 | 77 | 116 | 116 | 116 | 80 | 90 | 56 | 204 | 116 |
| Amount of terminal hydroxy group (ppm) | | 144 | 171 | 237 | 179 | 179 | 188 | 188 | 188 | 188 | 156 | 128 | 276 | 188 |

TABLE 3-continued

| | Example | | | | | | | | Comparative Example | | | | |
|---|---|---|---|---|---|---|---|---|---|---|---|---|---|
| | 1 | 2 | 3 | 4 | 5 | 6 | 7 | 8 | 1 | 2 | 3 | 4 | 5 |
| Initial YI | 0.7 | 0.6 | 0.9 | 0.5 | 0.6 | 0.7 | 1.2 | 1.4 | 0.7 | 0.9 | 0.8 | 0.9 | 1.6 |
| Lightfastness (500 h ΔYI) | 1.2 | 1.4 | 1.8 | 1.0 | 0.9 | 2.4 | 1.2 | 0.8 | 0.8 | 2.9 | 1.7 | 4.4 | 0.7 |
| Charpy Impact strength(kJ/m$^2$) | 4.0 | 4.8 | 4.7 | 7.6 | 5.4 | 3.7 | 3.5 | 3.4 | 5.7 | 2.8 | 2.9 | 3.6 | 3.2 |
| Pencil hardness | HB | HB | HB | HB | HB | F | F | F | B | F | F | F | F |
| Overall evaluation | A | A | B | A | A | B | B | B | C | C | C | C | C |

INDUSTRIAL APPLICABILITY

The aromatic polycarbonate resin composition according to the present invention is a resin material that exhibits an excellent surface hardness and strength as well as an excellent designability and lightfastness and can therefore be suitably used, for example, for various members for display devices, protective equipment, in-vehicle parts, monolayer sheets, multilayer sheets, and so forth, and thus has a high industrial applicability.

The invention claimed is:

1. An aromatic polycarbonate resin composition comprising an aromatic polycarbonate resin (A), the aromatic polycarbonate resin (A) comprising:
   a carbonate structural unit (X) derived from an aromatic dihydroxy compound of formula (1),
   a carbonate structural unit (Y) derived from an aromatic dihydroxy compound of formula (2), and
   0.01 to 1.80 parts by mass of an ultraviolet absorber (B) per 100 parts by mass of the aromatic polycarbonate resin (A),
   wherein an initial YI for a 2 mm-thick plate measured in accordance with ASTM E313 is not more than 1.4,
   wherein the carbonate structural units (X) and (Y) have a molar ratio (X)/(Y) in a range of 10/90 to 40/60,
   wherein the aromatic polycarbonate resin (A) includes at least one selected from the group consisting of a copolymer resin comprising carbonate structural units (X) and (Y) and a resin mixture comprising an aromatic polycarbonate resin (a1) comprising the carbonate structural unit (X) and an aromatic polycarbonate resin (a2) comprising the carbonate structural unit (Y), and
   wherein an amount of a cresolic hydroxy group derived from the aromatic dihydroxy compound represented by formula (1) is 60 to 160 ppm, relative to the aromatic polycarbonate resin (A);

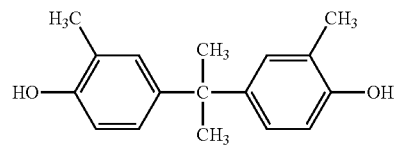
(1)

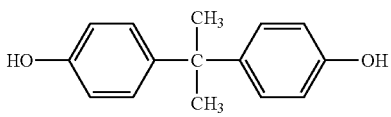
(2)

2. The aromatic polycarbonate resin composition of claim 1, wherein the aromatic polycarbonate resin (A) comprises an aromatic polycarbonate resin (a1) and an aromatic polycarbonate resin (a2),
   wherein the carbonate structural unit (X) is present in the aromatic polycarbonate resin (a1), and
   wherein the carbonate structural unit (Y) is present in the aromatic polycarbonate resin (a2).

3. The aromatic polycarbonate resin composition of claim 1, wherein an amount of a terminal hydroxy group in the aromatic polycarbonate resin (A) is in a range of 100 to 250 ppm relative to the mass of the aromatic polycarbonate resin (A).

4. The aromatic polycarbonate resin composition of claim 1,
   wherein, for a 500-hour exposure in a xenon lightfastness test in conformity with JASO M346 under conditions of irradiance: 70 W/m$^2$, 300 to 400 nm, BPT temperature: 89±3° C., relative humidity: 50±5%, inner side: quartz filter, outer side: soda lime filter, exposure: continuous,
   a difference (ΔYI) for a 2 mm-thick plate between the initial YI before the lightfastness test and YI after the lightfastness test, as measured in accordance with ASTM E313, is not more than 2.5.

5. A molded article comprising the aromatic polycarbonate resin composition of claim 1.

6. The molded article of claim 5, which is a member of at least one selected from the group consisting of a display device, a cover for a display device, a protective equipment, and an in-vehicle part.

* * * * *